(12) United States Patent
Ochi (10) Patent No.: US 9,707,804 B2
(45) Date of Patent: Jul. 18, 2017

(54) PNEUMATIC TIRE

(71) Applicant: BRIDGESTONE CORPORATION, Tokyo (JP)

(72) Inventor: Naoya Ochi, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 275 days.

(21) Appl. No.: 14/412,510

(22) PCT Filed: Jun. 18, 2013

(86) PCT No.: PCT/JP2013/003795
§ 371 (c)(1),
(2) Date: Jan. 2, 2015

(87) PCT Pub. No.: WO2014/006829
PCT Pub. Date: Jan. 9, 2014

(65) Prior Publication Data
US 2015/0191049 A1    Jul. 9, 2015

(30) Foreign Application Priority Data

Jul. 5, 2012  (JP) ................................ 2012-151591

(51) Int. Cl.
*B60C 11/11* (2006.01)
*B60C 11/03* (2006.01)
(Continued)

(52) U.S. Cl.
CPC ............... *B60C 11/11* (2013.01); *B60C 11/01* (2013.01); *B60C 11/0306* (2013.04);
(Continued)

(58) Field of Classification Search
CPC ..... B60C 11/11; B60C 11/03; B60C 11/0306; B60C 2011/0348; B60C 2011/036;
(Continued)

(56) References Cited

U.S. PATENT DOCUMENTS

2009/0114323 A1    5/2009  Yamane
2011/0297282 A1*  12/2011  Ochi ...................... B60C 11/11
                                                                    152/209.1
(Continued)

FOREIGN PATENT DOCUMENTS

CN       102196927 A    9/2011
CN       102416829 A    4/2012
(Continued)

OTHER PUBLICATIONS

International Search Report for PCT/JP2013/003795 dated Aug. 20, 2013.
(Continued)

*Primary Examiner* — Eric Hug
(74) *Attorney, Agent, or Firm* — Sughrue Mion, PLLC (57) ABSTRACT

By adopting an appropriate block pattern, a pneumatic tire guarantees the tire ground contact area without impairing drainage performance and enhances on-ice performance. On the tread are formed land portions (5a, 5b) defined by at least one circumferential main groove (3) extending in the tire circumferential direction and blocks (11) in a shoulder land portion (5b) located outermost in the tire width direction among the land portions (5a, 5b), the blocks (11) being defined by narrow grooves (7a, 7b) with a groove width narrower than that of the circumferential main groove (3) and by at least one auxiliary groove (9) with a groove width that increases outward in the tire width direction at least in a region not adjacent to the circumferential main groove. The area of the tread surface of each of the blocks (11) is in a range of 100 mm$^2$ to 200 mm$^2$.

7 Claims, 6 Drawing Sheets

(51) Int. Cl.
*B60C 11/01* (2006.01)
*B60C 11/12* (2006.01)

(52) U.S. Cl.
CPC .......... *B60C 11/1272* (2013.04); *B60C 11/12* (2013.01); *B60C 2011/036* (2013.04); *B60C 2011/0348* (2013.04); *B60C 2011/0353* (2013.04); *B60C 2011/0365* (2013.04); *B60C 2011/0372* (2013.04); *B60C 2011/1213* (2013.04)

(58) Field of Classification Search
CPC ..... B60C 2011/0365; B60C 2011/0372; B60C 2011/0353; B60C 11/0309; B60C 2011/0358; B60C 2011/0374; B60C 2011/0376
USPC .................... 152/902, 209.9, 209.16, 209.18
See application file for complete search history.

(56) References Cited

U.S. PATENT DOCUMENTS

| 2012/0037289 A1* | 2/2012 | Ochi | B60C 11/11 152/209.18 |
|---|---|---|---|
| 2012/0073715 A1 | 3/2012 | Kawauchi | |
| 2012/0291934 A1 | 11/2012 | Iwabuchi | |

FOREIGN PATENT DOCUMENTS

| EP | 0602971 A1 | 6/1994 |
|---|---|---|
| EP | 2281698 A1 | 2/2011 |
| EP | 2402178 A1 | 1/2012 |
| JP | 62-196706 U | 12/1987 |
| JP | 64018707 A | 1/1989 |
| JP | 03010908 A | 1/1991 |
| JP | 05085108 A | 4/1993 |
| JP | 6-127217 A | 5/1994 |
| JP | 07149114 A | 6/1995 |
| JP | 2002-192914 A | 7/2002 |
| JP | 2003237318 A | 8/2003 |
| JP | 2005349970 A | 12/2005 |
| JP | 2006240456 A | 9/2006 |
| JP | 2009-113652 A | 5/2009 |
| JP | 2010083462 A | 4/2010 |
| JP | 2010095148 A | 4/2010 |
| JP | 2010111270 A | 5/2010 |
| JP | 2010269769 A | 12/2010 |
| JP | 2010285040 A | 12/2010 |
| JP | 2011-42252 * | 3/2011 |
| JP | 2011-136656 A | 7/2011 |
| JP | 2012-066790 A | 4/2012 |
| RU | 2342257 C2 | 12/2008 |
| WO | 2011/111331 A1 | 9/2011 |

OTHER PUBLICATIONS

Communication dated May 25, 2015, issued by the State Intellectual Property Office of the People's Republic of China in counterpart Application No. 201310279352.0.

Communication dated Nov. 6, 2015, issued by the State Intellectual Property Office of the P.R.C. in corresponding Chinese Application No. 201310279352.0.

* cited by examiner

PNEUMATIC TIRE

CROSS REFERENCE TO RELATED APPLICATIONS

This application is a National Stage of International Application No. PCT/JP2013/003795 filed Jun. 18, 2014, claiming priority based on Japanese Patent Application No. 2012-151591, filed Jul. 5, 2012, the contents of all of which are incorporated herein by reference in their entirety.

TECHNICAL FIELD

The present invention relates to a pneumatic tire with a tread that has a plurality of blocks defined by grooves.

BACKGROUND ART

In many tires that have conventionally been proposed, particularly as winter pneumatic tires, the tread has a plurality of blocks defined by grooves, with a plurality of sipes formed on the tread surface of the blocks, in order to improve performance on icy and snowy roads by improving the edge effect (for example, see PTL 1).

CITATION LIST

Patent Literature

PTL 1: JP 2002-192914 A

SUMMARY OF INVENTION

Technical Problem

In a pneumatic tire with a conventional block pattern as above, however, the blocks collapse at the time of ground contact, and ground contact performance worsens. As a result, the tire ground contact area cannot be guaranteed, and sufficient braking performance, traction performance, and cornering performance on icy roads (on-ice performance) cannot be obtained. If each block is made larger to increase rigidity and improve ground contact performance, drainage performance becomes insufficient. It is therefore difficult to enhance on-ice performance without impairing drainage performance.

Accordingly, the present invention provides a pneumatic tire that, by adopting an appropriate block pattern, guarantees the tire ground contact area without impairing drainage performance and enhances on-ice performance.

Solution to Problem

In order to resolve the above problems, a pneumatic tire according to the present invention comprises a tread; a plurality of land portions on the tread, defined by at least one circumferential main groove extending in a tire circumferential direction; and a plurality of blocks on the tread in a shoulder land portion located outermost in a tire width direction among the land portions, the blocks being defined by a plurality of narrow grooves with a groove width narrower than that of the circumferential main groove and by at least one auxiliary groove with a groove width that increases outward in the tire width direction at least in a region not adjacent to the circumferential main groove, wherein an area of a tread surface of each of the blocks is in a range of 100 mm$^2$ to 200 mm$^2$. Here, "extending in a tire circumferential direction" refers to extending along the tire circumferential direction and includes the case of extending along the tire circumferential direction in a zigzag pattern and the case of extending along the tire circumferential direction while bending.

In this pneumatic tire, drainage performance is guaranteed by the circumferential main groove, the narrow grooves, and the auxiliary groove, and in the shoulder land portion, the groove width of the auxiliary groove is set appropriately so that the tire ground contact area of the blocks can be guaranteed in particular in a region inward in the tire width direction, thereby enhancing on-ice performance. Furthermore, the area of the tread surface of each of the blocks is in a range of 100 mm$^2$ to 200 mm$^2$, thus guaranteeing the rigidity of each block, improving the effect of removing a water film from between the road surface and the tread surface of the blocks, and even further enhancing on-ice performance.

In the pneumatic tire according to the present invention, the auxiliary groove preferably opens into the circumferential main groove and a tread ground contact edge. This structure allows for displacement of water between the circumferential main groove and the auxiliary groove and allows for drainage via the auxiliary groove, thereby enhancing drainage performance.

The term "tread ground contact edge" refers to the outermost position in the tire width direction of the tire surface in contact with the ground when the tire is attached to a regular rim with regular pressure applied and a regular load applied. A "regular rim" refers to a standard rim specified by the standards below in accordance with tire size. "Regular pressure" refers to air pressure listed in the standards below and corresponding to the maximum load capability for a single wheel of applicable size. The "regular load" refers to the maximum load (maximum load capability) for a single wheel of applicable size in the standards below. The standards are valid industrial standards for the region in which the tire is produced or used, such as the "JATMA Year Book" of the Japan Automobile Tire Manufacturers Association in Japan, "The Tire and Rim Association, Inc. Year Book" in the United States of America, and "The European Tyre and Rim Technical Organisation Standards Manual" in Europe.

In the pneumatic tire according to the present invention, the smallest groove width of the auxiliary groove is preferably equal to or less than the groove width of the narrow groove. This structure allows for a more reliable increase in the tire ground contact area and for enhancement of the on-ice performance.

In the pneumatic tire according to the present invention, the auxiliary groove preferably includes an inclined portion extending in a direction inclined with respect to the tire width direction, and from the inside outward in the tire width direction, the inclined portion is preferably inclined with respect to the tire width direction towards the same side along the tire circumferential direction on both sides of the tire equatorial plane. This structure allows for enhancement of the drainage performance when the tire rotates in a predetermined direction.

In the pneumatic tire according to the present invention, the narrow grooves and the auxiliary groove each preferably include an inclined portion inclined with respect to the tire circumferential direction and the tire width direction, and in at least a portion of the shoulder land portion, the inclined portion of the narrow grooves and the inclined portion of the auxiliary groove preferably intersect to form a grid, and a tread surface shape of each of the blocks is preferably one of a rectangle, a pentagon, a hexagon, a heptagon, and an octagon. This structure enhances the drainage performance around the blocks, and by providing the blocks with a polygonal shape, achieves an edge effect in multiple directions, thereby further enhancing the on-ice performance.

The pneumatic tire according to the present invention preferably further comprises an enlarged groove portion with a large groove width at an intersection portion where the narrow grooves intersect and at an intersection portion where the narrow grooves and the auxiliary groove intersect. This structure enhances the drainage performance and enhances the on-snow performance by improving the snow column shear force on snowy roads.

In the pneumatic tire according to the present invention, a sipe is preferably formed on a tread surface of the blocks. This structure improves the water film removal effect and enhances the on-ice performance by improving the edge effect. The term "sipe" refers to a shallow cut, inward from the surface of the blocks, that can close during ground contact.

Furthermore, in the pneumatic tire according to the present invention, the groove width of the narrow grooves is preferably in a range of 0.5 mm to 3.0 mm. This structure not only guarantees drainage performance but also guarantees block rigidity, improves ground contact performance, and enhances on-ice performance.

Advantageous Effect of Invention

According to the present invention, it is possible to provide a pneumatic tire that, by adopting an appropriate block pattern, guarantees the tire ground contact area without impairing drainage performance and enhances on-ice performance.

BRIEF DESCRIPTION OF DRAWINGS

The present invention will be further described below with reference to the accompanying drawings, wherein.

DESCRIPTION OF EMBODIMENTS

The following describes an embodiment of the present invention in detail.

Figure 1:
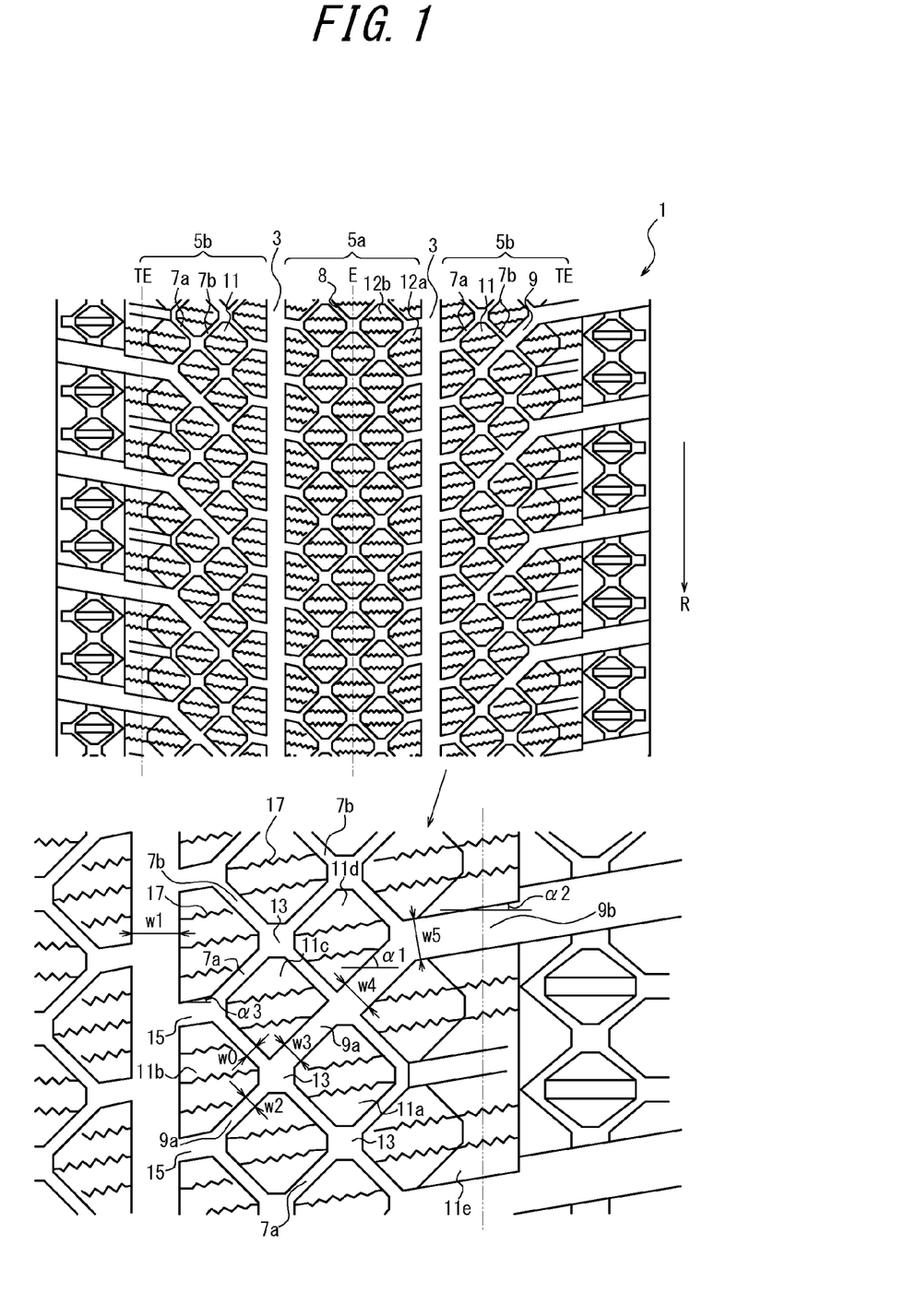
FIG. 1 is a development view of a portion of the tread of a pneumatic tire according to an embodiment of the present invention.

FIG. 1 is a partial development view of a tread pattern of a pneumatic tire (referred to below as a "tire") in an embodiment according to the present invention. While omitted from the drawings, the pneumatic tire in the present embodiment is provided, like a normal tire, with a pair of beads, a pair of sidewalls extending from the beads outward in the tire radial direction, and a tread spanning between the sidewalls. A carcass extends toroidally between bead cores embedded in the beads, and a belt is disposed outward in the tire radial direction on a crown of the carcass.

As illustrated in FIG. 1, on the tread of the tire 1, two circumferential main grooves 3 extending linearly along the tire circumferential direction are provided, defining one central land portion 5a and two shoulder land portions 5b.

In each of the shoulder land portions 5b, a plurality of blocks 11 are defined by narrow grooves 7a, 7b and auxiliary grooves 9. The groove width w0 of the narrow grooves 7a, 7b is narrower than the groove width w1 of the circumferential main grooves, and the groove width of the auxiliary grooves 9 increases from the inside outward in the tire width direction. The auxiliary grooves 9 are inclined with respect to the tire width direction towards one side in the tire circumferential direction, and each of the narrow grooves 7a, which are inclined towards the same side as the auxiliary grooves 9, is provided between auxiliary grooves 9 adjacent in the tire circumferential direction. The narrow grooves 7b, which are inclined with respect to the tire width direction towards the opposite side than the auxiliary grooves 9, intersect with the auxiliary grooves 9 and the narrow grooves 7a, and these auxiliary grooves 9, narrow grooves 7a, and narrow grooves 7b form a grid of grooves. Enlarged groove portions 13 with an enlarged groove width are formed at intersection portions between the narrow grooves 7a, auxiliary grooves 9, and narrow grooves 7b. The blocks 11 defined by these grooves are in a staggered arrangement along the tire circumferential direction, and the blocks 11 have a polygonal shape, such as that of an octagon yielded by cutting off the corners of a rectangle.

The auxiliary grooves 9 open into the circumferential main groove 3 and the tread ground contact edge TE. At the opening into the circumferential main groove 3, a main groove opening 15 with a large groove width is formed. The groove width of the auxiliary grooves 9 is smallest near the main groove opening 15, and the smallest groove width w2 of the auxiliary grooves 9 is equal to or less than the groove width w0 of the narrow grooves 7a, 7b. In other words, the groove width of the auxiliary grooves 9 increases outward in the tire width direction at least in a portion not adjacent to the circumferential main groove 3, i.e. away from the main groove opening 15. In the present embodiment, the groove width w2 is equivalent to the groove width w0 of the narrow grooves 7a, 7b, yet the groove width w2 may be smaller than the groove width w0 of the narrow grooves 7a, 7b. Furthermore, the width of the main groove opening 15 is larger than w2 in the present embodiment yet may be equal to or less than w2. The groove width of the auxiliary grooves 9 changes outward in the tire width direction stepwise from the smallest groove width w2 to w3, w4, and w5, yet the groove width may change gradually instead of stepwise. Note that the groove width of the auxiliary grooves 9 preferably changes stepwise, yielding a greater edge region and more reliably enhancing on-ice traction performance and on-ice braking performance.

In the present embodiment, a plurality of narrow grooves 8 inclined in mutually opposite directions are provided in a grid pattern in the central land portion 5a, defining a plurality of blocks 12a, 12b. As illustrated, the blocks 12a adjacent to the circumferential main grooves 3 are hexagonal, whereas the other blocks 12b are octagonal.

According to the tire with the above structure, the circumferential main grooves 3, narrow grooves 7a, 7b, and auxiliary grooves 9 guarantee drainage performance, improve the ground contact performance of the blocks, and enhance on-ice performance. Since the groove width of the auxiliary grooves 9 increases outward in the tire width direction, high drainage performance can be achieved. The small groove width of the auxiliary grooves 9 inward in the tire width direction also guarantees the tire ground contact area of the land portions and enhances on-ice performance.

The auxiliary grooves 9 open into the circumferential main groove 3 and the tread ground contact edge TE. Therefore, water can be displaced freely between the circumferential main grooves 3, auxiliary grooves 9, and narrow grooves 7a, 7b and moreover can drain to the outside of the tread ground contact edge TE, thereby even further enhancing drainage performance. Furthermore, the smallest groove width of the auxiliary grooves 9 is equal to or less than the groove width of the narrow grooves 7a, 7b, thus further guaranteeing rigidity of the blocks, improving the ground contact performance of the blocks, and enhancing on-ice performance.

The shoulder land portions 5b on both sides of the tire equatorial plane form a pattern that is line symmetrical about the tire equatorial plane and shifted in the tire circumferential direction. In other words, from the inside outward in the tire width direction, all of the auxiliary grooves 9 are inclined with respect to the tire width direction towards the same side along the tire circumferential direction. By inclining the auxiliary grooves 9 in the same direction, particularly high drainage performance can be achieved when the tire rotates in a predetermined direction. In this example, the drainage performance improves when the tire rotates in the direction of the arrow R in FIG. 1. By mounting the tire on a vehicle so that the tire rotates in this direction when the vehicle is driven forward, the desired drainage performance can be achieved.

In the tire of the present embodiment, the area of the tread surface of each of the blocks 11 is in a range of 100 mm² to 200 mm², thus guaranteeing the rigidity of each block, improving the effect of water film removal by decreasing the distance from the central region of the block 11 to the perimeter of the block 11, and even further enhancing on-ice performance. Similarly, in the central land portion 5a as well, the area of the tread surface of the blocks 12a, 12b is preferably in a range of 100 mm² to 200 mm² to guarantee drainage performance and block rigidity.

In the tire of the present embodiment, the blocks 11 defined by the narrow grooves 7a, 7b and auxiliary grooves 9 provided in a grid pattern have the shape of a rectangle with the corners cut off. As illustrated, by forming the blocks 11a as octagons, the blocks 11b as pentagons, the blocks 11c as hexagons, and the blocks 11d as heptagons, an edge effect can be achieved with respect to forces in multiple directions, and since the corners of a rectangle break off easily due to contact with the road surface, adopting a shape in which these portions are cut off or chamfered achieves the effect of increasing the rigidity of each block and suppressing uneven wear. Furthermore, as illustrated, the blocks 11 are arranged so that one diagonal, when each block is considered to be a rectangle, extends in the tire circumferential direction, resulting in the narrow grooves 7a, 7b and auxiliary grooves 9 being inclined with respect to both the tire circumferential direction and the tire width direction. This arrangement enhances drainage performance in the tire circumferential direction as compared to when the grooves extend in parallel to the tire width direction.

In the tire of the present embodiment, enlarged groove portions 13 with an enlarged groove width are formed at intersection portions between the narrow grooves 7a, 7b and auxiliary grooves 9 that are arranged in a grid. In other words, the blocks 11 adjacent to the enlarged groove portions 13 have a shape such that corners of the rectangles are chamfered. The distance between blocks adjacent in the tire circumferential direction and the tire width direction with an enlarged groove portion 13 therebetween is greater than when the narrow grooves 7a, 7b simply intersect with a constant groove width. As a result, the groove capacity increases at certain portions, thus improving drainage performance and also enhancing on-snow performance by improving the snow column shear force on snowy roads.

In the tire of the present embodiment, at least one sipe 17, in this example two or three, extending in a zigzag pattern in the tire width direction are formed on the tread surface of each block 11. The edge effect due to the sipes 17 effectively enhances the on-ice performance. The direction in which the sipes 17 extend can be set in accordance with the performance considered to be important. For example, when traction or braking performance is considered important, it is effective to arrange the sipes along the tire width direction, whereas when cornering performance is considered important, it is effective to arrange the sipes at an inclination with respect to the tire width direction.

The groove width w0 of the narrow grooves 7a, 7b is preferably in a range of 0.5 mm to 3.0 mm. This range guarantees the drainage performance and water film removal capability and also guarantees block rigidity, improves the ground contact performance of the blocks, and enhances on-ice performance. If the groove width w0 of the narrow grooves 7a, 7b is less than 0.5 mm, the drainage performance might not be sufficiently obtained, and the water film removal effect may be reduced, preventing the guarantee of ground contact performance. If the groove width w0 exceeds 3.0 mm, the block rigidity may lessen, and the ground contact performance may worsen. Also, sufficient on-ice performance might not be obtained due to an insufficient tire ground contact area.

The auxiliary grooves 9 include a linearly extending first inclined portion 9a that communicates with the outside, in the tire width direction, of the main groove opening 15 and a linearly extending second inclined portion 9b that, while bending, communicates with the outside of the first inclined portion 9a in the tire width direction, reaching and extending beyond the tread ground contact edge TE. The first inclined portion 9a and the second inclined portion 9b may be in communication smoothly, with a curved portion therebetween. The first inclined portion 9a preferably forms an angle α1, with respect to the tire width direction, larger than that of the second inclined portion 9b and more preferably forms an angle of 20° to 60° with respect to the tire width direction. This structure not only guarantees drainage performance but also suppresses a reduction in block rigidity, improves ground contact performance, and even further enhances on-ice performance. The angle α2 of the second inclined portion with respect to the tire width direction is preferably 30° or less. Such an angle guarantees the rigidity of blocks defined by the auxiliary grooves 9 and suppresses uneven wear that easily occurs near the tread ground contact edge TE.

The direction in which the main groove opening 15 extends is preferably inclined with respect to the tire width direction at an angle α3 of 30° or less. This structure suppresses a reduction in rigidity of blocks adjacent to the circumferential main grooves 3, improves ground contact performance, and achieves the effect of reducing uneven wear.

The area of the tread surface of the blocks 11e located outermost in the tire width direction is preferably two or more times that of the other blocks 11a, 11b, 11c, and 11d.

Such an area both improves uneven wear resistance and enhances on-ice performance.

Figure 2:
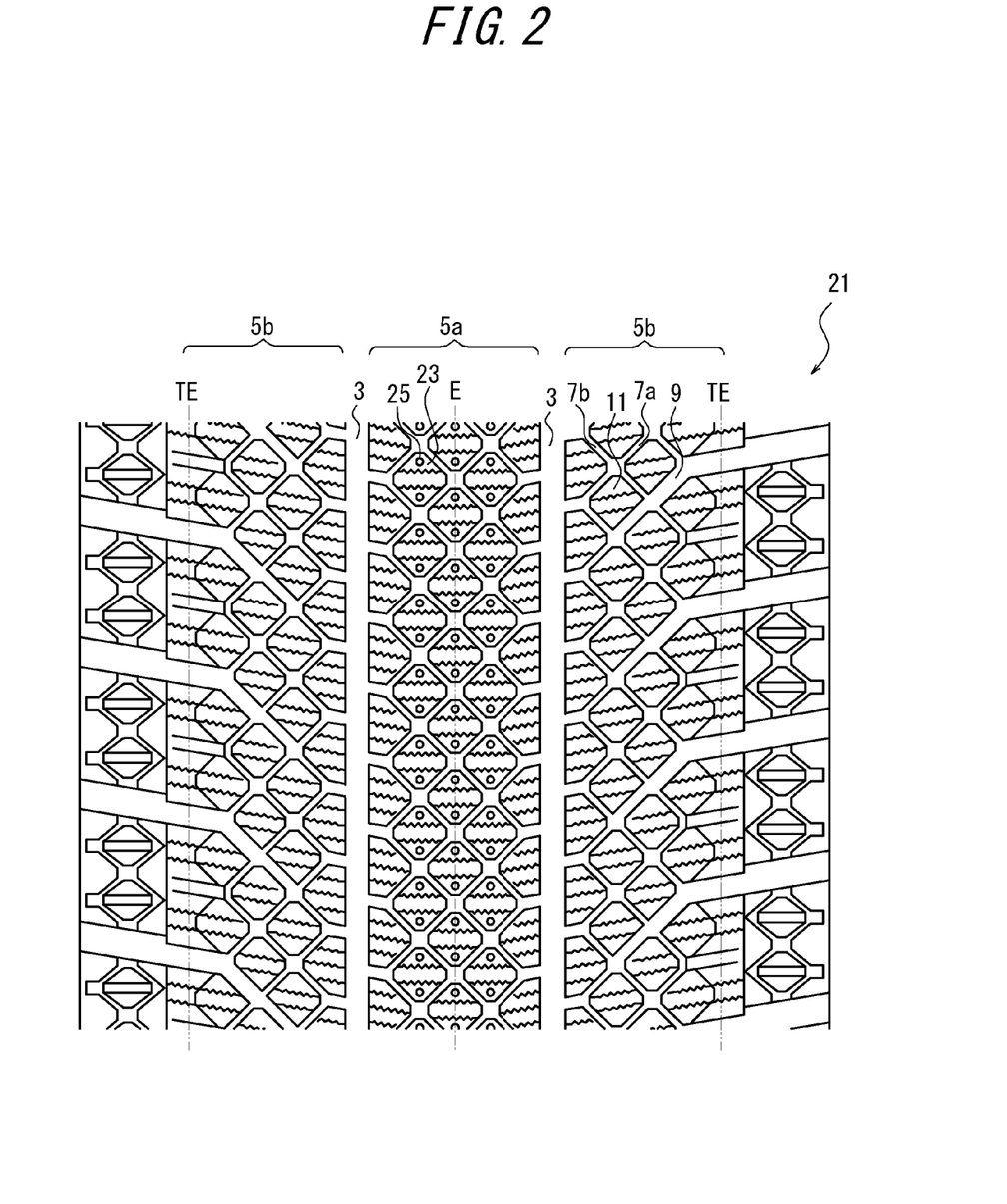
FIG. 2 is a development view of a portion of the tread of a pneumatic tire according to another embodiment of the present invention.
Figure 3:
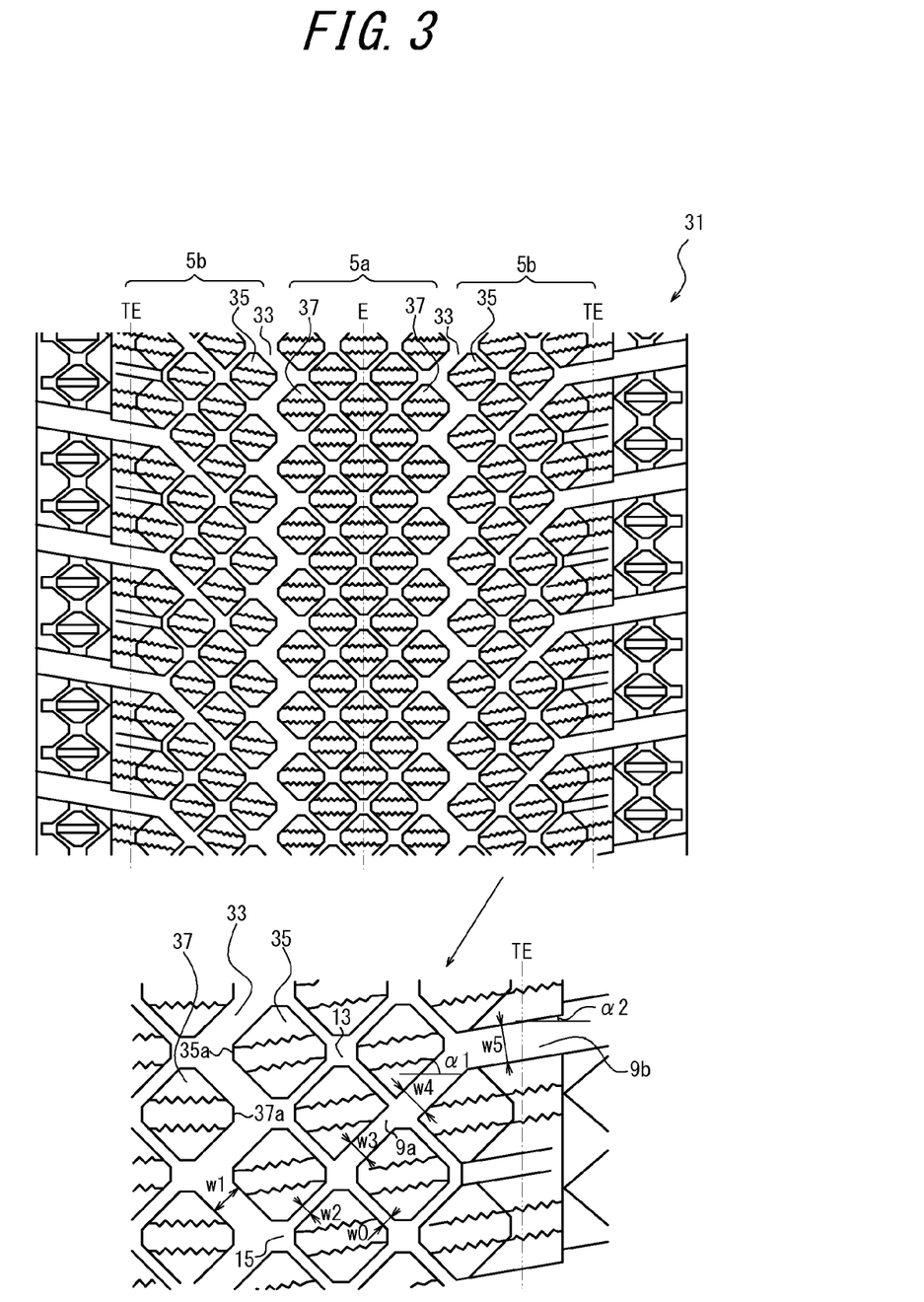
FIG. 3 is a development view of a portion of the tread of a pneumatic tire according to yet another embodiment of the present invention.

Next, other embodiments of the present invention are described. FIGS. 2 and 3 are partial development views of the tread pattern of tires in other embodiments according to the present invention. Note that the same reference signs are used for members that are the same as in the tire in FIG. 1, and a description thereof is omitted.

In the central land portion 5a of the tire 21 in FIG. 2, circular, small openings 25 with a diameter of 0.5 mm to 3 mm and a depth of 0.5 mm to 10 mm are formed in the blocks 23, opening into the tread surface of the blocks 23 and terminating within the blocks 23. The remaining structure is the same as that of the tire in Embodiment 1. Forming such small openings 25 achieves the effect of absorbing the water film between the tread surface and the road surface, increases ground contact performance, and further enhances on-ice performance.

In the tire 31 in FIG. 3, circumferential main grooves 33 extend in a zigzag pattern. The innermost edge 35a in the tire width direction of a block 35 adjacent to the outside, in the tire width direction, of a circumferential main groove 33 and the outermost edge 37a in the tire width direction of a block 37 adjacent to the inside, in the tire width direction, of that circumferential main groove 33 are at the same position in the tire width direction, and the blocks 35 and 37 are formed so as not to overlap when viewed in the tire circumferential direction. Forming the circumferential main grooves 33 in a zigzag pattern increases the edge effect in the tire width direction, thereby improving the traction performance and braking performance on ice and snow. Furthermore, when forming the circumferential main grooves in a zigzag pattern as in the present embodiment, the outermost edge 37a may be positioned further inward in the tire width direction than the innermost edge 35a, without overlapping when viewed in the tire circumferential direction, in order to guarantee drainage performance.

EXAMPLES

Next, tires according to the present invention were produced, and the on-ice performance was evaluated, as described below. The tires of Examples 1 to 3 and the Comparative Examples are all size 195/65R15 radial tires for passenger cars.

The tire in Example 1 has the tread pattern illustrated in FIG. 1 and the specific dimensions listed in Table 1. The tire in Example 2 has the tread pattern illustrated in FIG. 2, and includes circular, small openings with a diameter of 1.5 mm opening into the tread surface of the blocks and terminating within the blocks. The remaining structure is the same as the tire of Example 1.

The tire in Example 3 has the tread pattern illustrated in FIG. 3, with the circumferential main grooves 33 extending in a zigzag pattern. The innermost edge in the tire width direction of a block adjacent to the outside, in the tire width direction, of a circumferential main groove 33 and the outermost edge in the tire width direction of a block adjacent to the inside, in the tire width direction, of that circumferential main groove 33 are at the same position in the tire width direction. Furthermore, the tires of Comparative Examples 1 and 2 respectively have the tread patterns illustrated in FIGS. 4 and 5. The specific dimensions of each tire are listed in Table 1.

Figure 6:
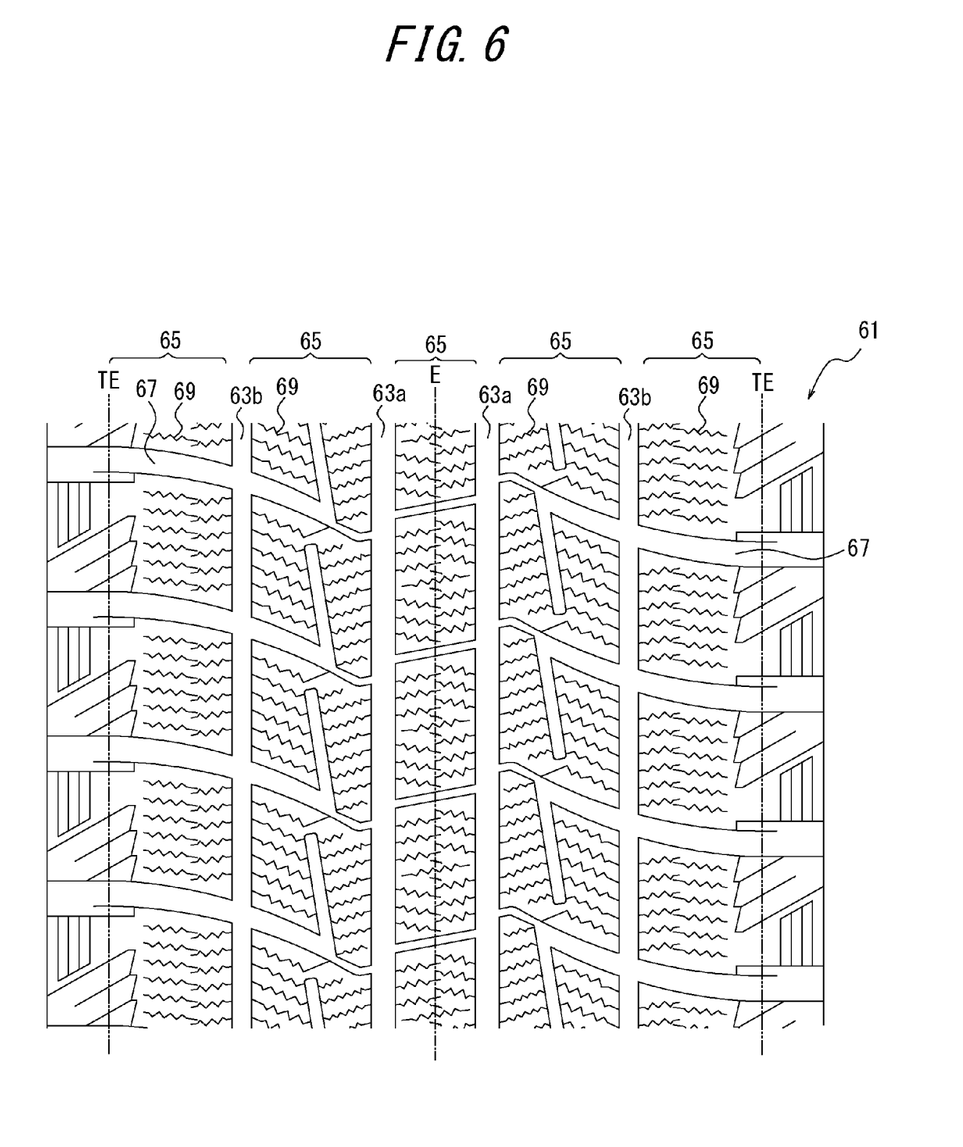
FIG. 6 is a development view of a portion of the tread of a pneumatic tire according to a comparative example.

The tire in Comparative Example 3 has the tread pattern illustrated in FIG. 6. On the tread are provided four circumferential main grooves 63a, 63b extending in the tire circumferential direction and five land portions 65 adjacent thereto (referred to, from the center in the tire width direction, as a central land portion, intermediate land portions, and shoulder land portions). The two circumferential main grooves 63a positioned inward in the tire width direction have a width of 6.5 mm and a depth of 9.0 mm, and the two circumferential main grooves 63b positioned outward in the tire width direction have a width of 5.0 mm and a depth of 9.0 mm. In the central land portion, the intermediate land portions, and the shoulder land portions, a plurality of blocks are defined by lateral grooves 67 inclined in the tread circumferential direction. A plurality of sipes 69 are formed in a zigzag pattern in each block.

These tires were mounted on vehicles, and the braking performance, traction performance, and cornering performance on icy roads were assessed.

(1) On-Ice Braking Performance Assessment Test

The braking distance from a speed of 20 km/h until a complete stop on an icy road at a test course was measured, and the on-ice braking performance was assessed as the inverse of the measured distance. The assessment result was expressed as an index, with the result for Comparative Example 3 as 100. A larger value indicates better on-ice braking performance. Table 1 lists the assessment results.

(2) On-Ice Traction Performance Assessment Test

The time to accelerate from an initial speed of 10 km/h until reaching 30 km/h on an icy road at a test course was measured, and the on-ice traction performance was assessed from the measured time. The assessment result was expressed as an index, with the result for Comparative Example 3 as 100. A larger value indicates better on-ice traction performance. Table 1 lists the assessment results.

(3) On-Ice Cornering Performance Assessment Test

The cornering performance on an icy circular road at a test course was assessed by the driver's feeling. The assessment result was expressed as an index, with the result for Comparative Example 3 as 100. A larger value indicates better on-ice cornering performance. Table 1 lists the assessment results.

TABLE 1

Figure 4:
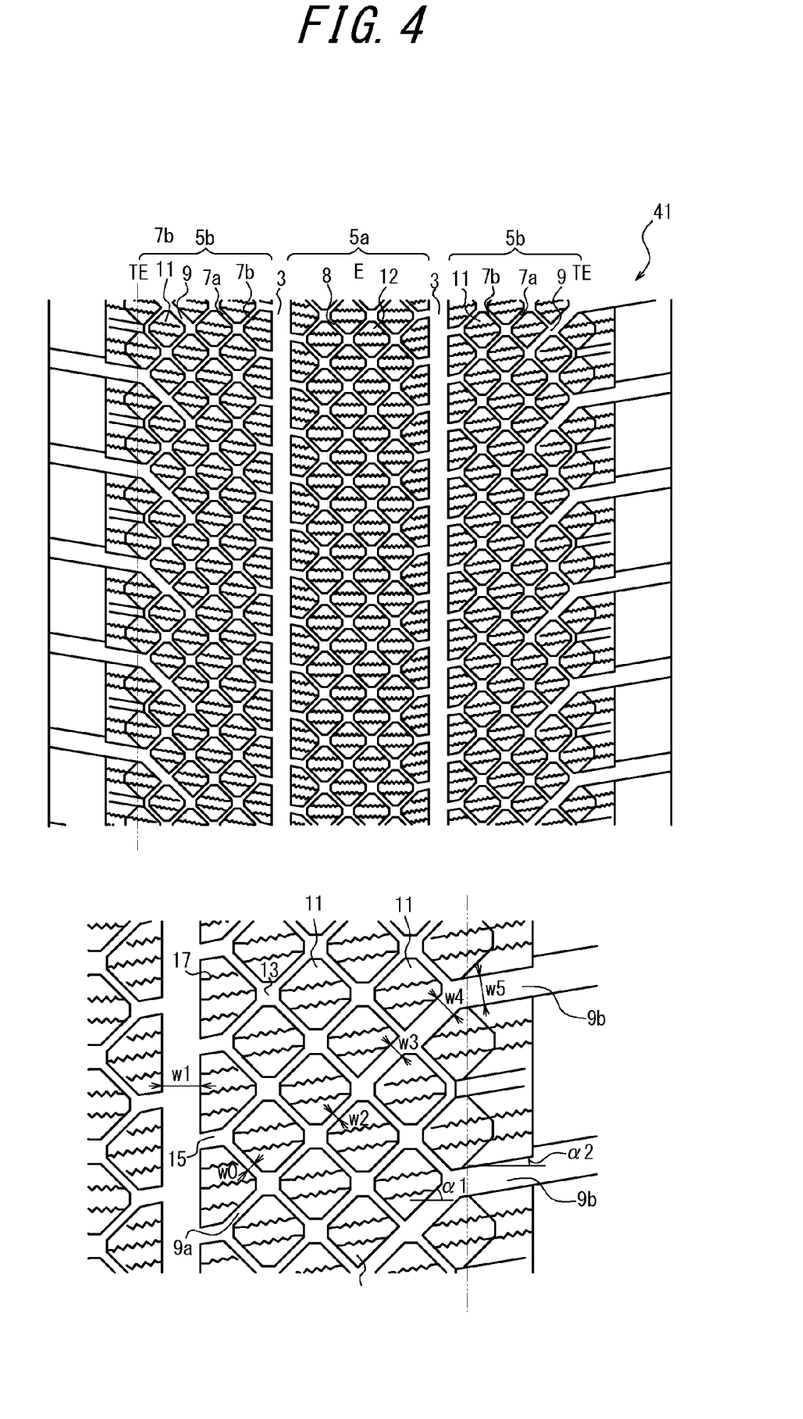
FIG. 4 is a development view of a portion of the tread of a pneumatic tire according to a comparative example.
Figure 5:
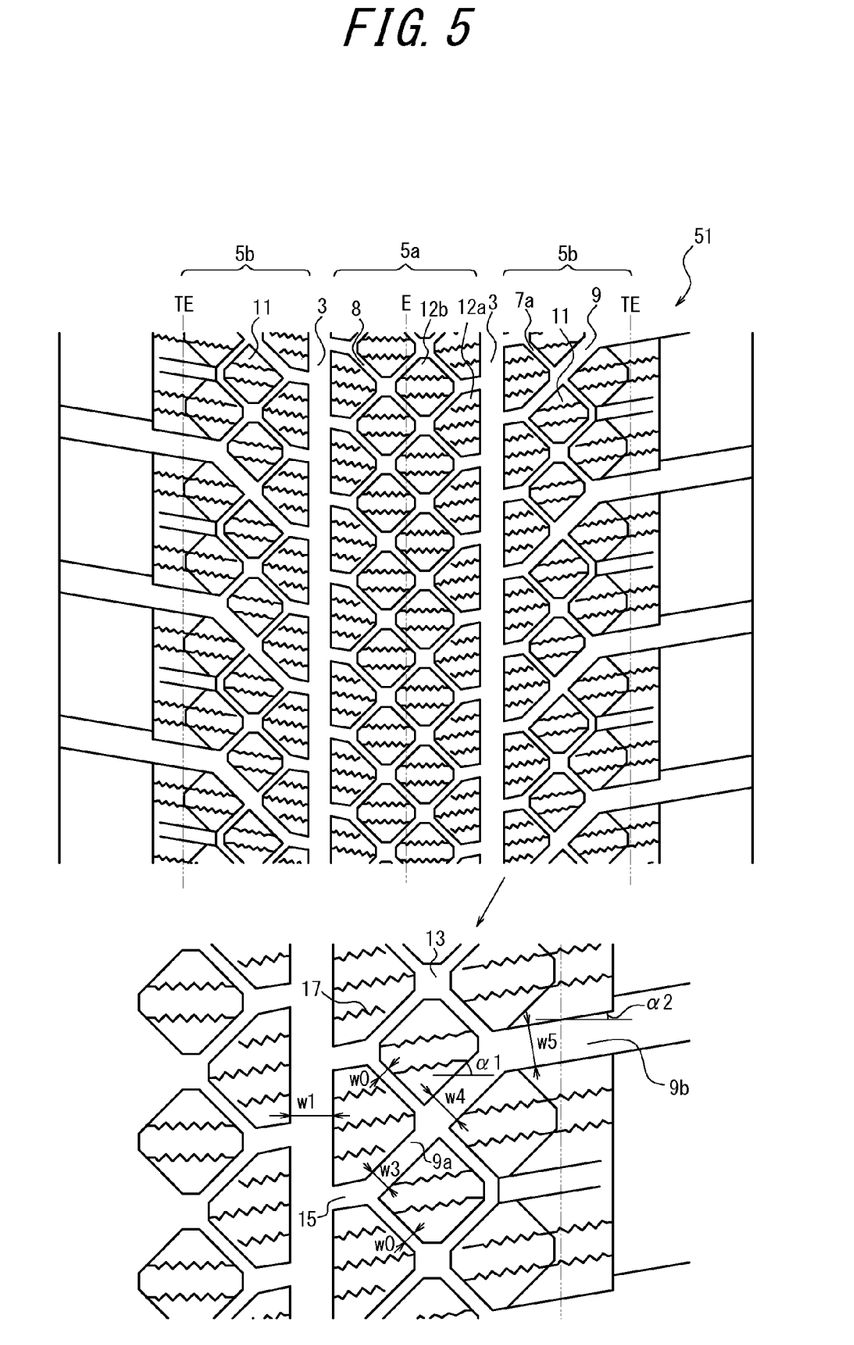
FIG. 5 is a development view of a portion of the tread of a pneumatic tire according to a comparative example.

|  | Example 1 | Example 2 | Example 3 | Comparative Example 1 | Comparative Example 2 | Comparative Example 3 |
| --- | --- | --- | --- | --- | --- | --- |
| Corresponding figure | FIG. 1 | FIG. 2 | FIG. 3 | FIG. 4 | FIG. 5 | FIG. 6 |
| Negative ratio (%) | 28.1 | 28.1 | 28.1 | 28 | 28.4 | — |
| Reference pitch P (mm) | 40 | 40 | 40 | 30.8 | 50 | — |
| Circumferential main groove width w1 (mm) | 6.5 | 6.5 | 6.5 | 6 | 7.2 | — |
| Groove depth of circumferential main groove (mm) | 9 | 9 | 9 | 9 | 9 | — |
| Block area (mm$^2$) | 137-153 | 137-153 | 137-153 | 81-91 | 213-240 | — |
| Width w0 of narrow grooves (mm) | 1.5 | 1.5 | 1.5 | 1.2 | 2 | — |

TABLE 1-continued

| | Example 1 | Example 2 | Example 3 | Comparative Example 1 | Comparative Example 2 | Comparative Example 3 |
|---|---|---|---|---|---|---|
| Widths w2/w3/w4 of first inclined portion in auxiliary groove (mm) | 1.5/3/5 | 1.5/3/5 | 1.5/3/5 | 1.2/2.5/4 | 4/5.7 | — |
| Angle of first inclined portion in auxiliary groove with respect to tire width direction (°) | 45 | 45 | 45 | 45 | 45 | — |
| Width w5 of second inclined portion in auxiliary groove (mm) | 6.2 | 6.2 | 6.2 | 5 | 7.8 | — |
| Angle of second inclined portion in auxiliary groove with respect to tire width direction (°) | 10 | 10 | 10 | 10 | 10 | — |
| On-ice braking | 125 | 127 | 125 | 127 | 100 | 100 |
| On-ice traction | 123 | 120 | 127 | 103 | 110 | 100 |
| On-ice cornering | 115 | 115 | 113 | 95 | 98 | 100 |

The assessment results in Table 1 show that as compared to the tire of Comparative Example 3, the tires of Examples 1 to 3 have improved on-ice braking performance, on-ice traction performance, and on-ice cornering performance.

INDUSTRIAL APPLICABILITY

According to the present invention, by thus adopting an appropriate block pattern, it is possible to provide a pneumatic tire that guarantees the tire ground contact area without impairing drainage performance and that enhances on-ice performance.

REFERENCE SIGNS LIST

1: Pneumatic tire
3: Circumferential main groove
5a: Central land portion
5b: Shoulder land portion
7a, 7b: Narrow groove
9: Auxiliary groove
11: Block
13: Enlarged groove portion
15: Main groove opening
17: Sipe

The invention claimed is:

1. A pneumatic tire comprising:
a tread;
a plurality of land portions on the tread, defined by at least one circumferential main groove extending in a tire circumferential direction; and
a plurality of blocks on the tread in a shoulder land portion located outermost in a tire width direction among the land portions, the blocks being defined by a plurality of narrow grooves with a groove width narrower than that of the circumferential main groove and by at least one auxiliary groove with a groove width that increases outward in the tire width direction at least in a region not adjacent to the circumferential main groove, wherein
an area of a tread surface of each of the blocks is in a range of 100 mm$^2$ to 200 mm$^2$, and
further comprising an enlarged groove portion with a large groove width at an intersection portion where the narrow grooves intersect and at an intersection portion where the narrow grooves and the auxiliary groove intersect.

2. The pneumatic tire according to claim 1, wherein the auxiliary groove opens into the circumferential main groove and a tread ground contact edge.

3. The pneumatic tire according to claim 1, wherein a smallest groove width of the auxiliary groove is less than or equal to the groove width of the narrow groove.

4. The pneumatic tire according to claim 1, wherein
the auxiliary groove includes an inclined portion extending in a direction inclined with respect to the tire width direction, and
from the inside outward in the tire width direction, the inclined portion is inclined with respect to the tire width direction towards the same side along the tire circumferential direction on both sides of a tire equatorial plane.

5. The pneumatic tire according to claim 1, wherein the narrow grooves and the auxiliary groove each include an inclined portion inclined with respect to the tire circumferential direction and the tire width direction, and
in at least a portion of the shoulder land portion, the inclined portion of the narrow grooves and the inclined portion of the auxiliary groove intersect to form a grid, and a tread surface shape of each of the blocks is one of a rectangle, a pentagon, a hexagon, a heptagon, and an octagon.

6. The pneumatic tire according to claim 1, wherein a sipe is formed on a tread surface of the blocks.

7. The pneumatic tire according to claim 1, wherein the groove width of the narrow grooves is in a range of 0.5 mm to 3.0 mm.

* * * * *